United States Patent [19]

Abo et al.

[11] 4,368,616

[45] Jan. 18, 1983

[54] TWO-SHAFT GAS TURBINE ENGINE

[75] Inventors: Toshimi Abo; Hidetoshi Kanegae, both of Yokohama, Japan

[73] Assignee: Nissan Motor Co., Ltd., Yokohama, Japan

[21] Appl. No.: 134,989

[22] Filed: Mar. 28, 1980

[30] Foreign Application Priority Data

Mar. 29, 1979 [JP] Japan .................................. 54/37542

[51] Int. Cl.³ ............................ F02C 3/10; F02C 7/26
[52] U.S. Cl. ............................ 60/39.14 R; 60/34.16 R
[58] Field of Search .................... 60/39.14 R, 39.16 R, 60/39.28 R

[56] References Cited

U.S. PATENT DOCUMENTS

| | | | |
|---|---|---|---|
| 3,606,754 | 9/1971 | White | 60/39.14 R |
| 4,010,605 | 3/1977 | Uram | 60/39.14 R |
| 4,040,250 | 8/1977 | Saunders et al. | 60/39.16 R |
| 4,276,743 | 7/1981 | LaGrone | 60/39.14 R |

Primary Examiner—Louis J. Casaregola
Attorney, Agent, or Firm—Lowe, King, Price & Becker

[57] ABSTRACT

To shorten the time length of a start phase of the operation of a two-shaft gas turbine engine, closed-loop control of the rate of fuel feed is performed based on the magnitude of deviation of actual rate of rotation of the gas generator shaft from a target value during a time period shortly after starting of the engine, until actual speed of the power turbine sufficiently nears a target value, and then the basis of closed-loop control is switched over to the magnitude of deviation of actual speed of the power turbine from the target value. This method is practised by appropriately presetting the target value of the rotation rate of the gas generator shaft and by continuously making a comparison between the aforementioned two deviations and always selecting the smaller one of the two for use it as a feedback signal to produce a fuel feed rate control signal.

12 Claims, 2 Drawing Figures

TWO-SHAFT GAS TURBINE ENGINE

BACKGROUND OF THE INVENTION

This invention relates to a method of controlling the feed of fuel to a two-shaft gas turbine engine, particularly during a start phase of the engine operation, and specifically to a fuel feed control system constructed to perform the same method.

Generally two-shaft gas turbine engines are operated by the employment of closed-loop control (feedback control) of fuel feed so that the rate of rotation of the power turbine during steady state operation may be kept in agreement with a predetermined target value. More particularly, the rate of fuel feed is regulated according to a control signal which may be fundamentally proportional to the magnitude of deviation of actual rate of rotation of the power turbine from the target value or may comprise a component fundamentally proportional to the deviation and another component produced by an integration of the deviation with respect to time. During a start phase of the engine operation, however, there arises a problem that, since the magnitude of the aforementioned deviation is too large during this phase, the rate of fuel feed under closed-loop control is increased by excessively large values. This problem occurs whether the control signal is a proportional signal or a proportional and integral signal, resulting and typically results in continuation of the feed of excessively large amounts of fuel.

When starting a gas turbine engine, it is necessary to maintain a specific air-to-fuel ratio which is optimum to ignition, so that fuel should be fed at a feed rate appropriate to realize the optimum air-to-fuel ratio, that is, at a rate well balanced with the rate of air intake which depends on the rate of rotation of the compressor turbine driven by a starter motor.

In view of this necessity and the above explained problem, at starting and during a certain time period immediately after starting it has been considered unsuitable to control the rate of fuel feed by a closed-loop control method wherein deviations of actual speeds of the power turbine are corrected forcibly by varying the rate of fuel feed. Conventionally, therefore, closed-loop control of fuel feed is commenced when the rate of rotation of the power turbine rises to a suitable level a certain length of time after starting of the engine. During this time period, fuel is fed substantially at a constant feed rate which is determined on the basis of experimental results to realize an air-to-fuel ratio optimum to ignition. However, this method suffers a disadvantage that the start phase of the engine operation consumes an undesirably long period of time. This extension of the start phase occurs because a desired extent of increase in the power turbine speed is awaited without taking any particular accelerating measure and without varying the fuel feed rate determined so as to be optimum to ignition, i.e. a relatively low rate of fuel feed. This disadvantage becomes very serious particularly when the gas turbine engine is used as a prime mover in an electric-power generating system for emergency service and accordingly is required to have as short as possible a starting time.

SUMMARY OF THE INVENTION

It is a fundamental object of the present invention to solve the above described problems related to the control of fuel feed to a two-shaft gas turbine engine, especially during a start phase of the engine operation.

It is another object of the invention to provide a novel method of controlling the rate of fuel feed to a two-shaft gas turbine engine, which method enables a substantial shortening in the length of time required for starting of the engine.

It is a further object of the invention to provide a fuel feed control system for a two-shaft gas turbine engine as a materialization of the control method according to the invention.

As a method of controlling the rate of fuel feed to a two-shaft gas turbine engine in which a gas generator shaft and a power turbine shaft rotate independently of each other, the present invention is characterized primarily by performing a closed-loop control of the fuel feed rate during a time period shortly after starting of the engine. During this time period, control is based on the magnitude of a deviation of actual rate of rotation of the gas generator shaft, i.e. actual speed of the compressor turbine, from a target value. This mode of closed-loop control is continued until the actual rate of rotation of the power turbine sufficiently nears a target value. Thereafter, the actual rate of rotation of the power turbine shaft is employed, instead of the rotation rate of the gas generator shaft, as the basis of closed-loop control of the fuel feed rate.

By performing the closed-loop control of the fuel feed rate based on the rotation rate of the gas generator shaft during a start phase of the engine operation, it becomes possible to efficiently accelerate the engine speed, that is, to gain a rated speed in a short time, without causing feed of excessively large amounts of fuel.

It is preferable that at the time of starting the engine and during a short period of time immediately thereafter fuel is fed at a present feed rate so as to maintain an air-fuel ratio suitable to ignition, meaning that the aforementioned closed-loop control on the basis of the rotation rate of the gas generator shaft is preceded by a short-time open-loop control.

A fuel feed rate control system according to the invention includes a comparison-and-selection means for continuously making a comparison between a deviation of actual rate of rotation of the gas generator shaft from a target value and a deviation of actual rate of rotation of the power turbine shaft from a target value, and always selecting the smaller of these two deviations to be used as a feedback signal to produce a fuel feed rate control signal. By utilizing the comparison-selection means and by appropriately presetting the target value of the rotation rate of the gas generator shaft, it becomes possible to control the rate of fuel feed initially based on the rate of rotation of the gas generator shaft and thereafter based on the rate of rotation of the power turbine shaft.

Preferably the control system includes changeover means for sequentially and automatically performing the aforementioned open-loop control, the first mode of closed-loop control (on the basis of the rotation of the gas generator shaft) and the second mode of closed-loop control (on the basis of the rotation of the power turbine shaft) and, furthermore, a modulation means for raising the level of a target value of the rate of rotation of the gas generator shaft during performance of the first mode closed-loop control.

BRIEF DESCRIPTION OF THE DRAWINGS

FIG. 2 is a chart illustrating the manner of fuel feed control performed by the system of FIG. 1.

DESCRIPTION OF THE PREFERRED EMBODIMENTS

Figure 1:
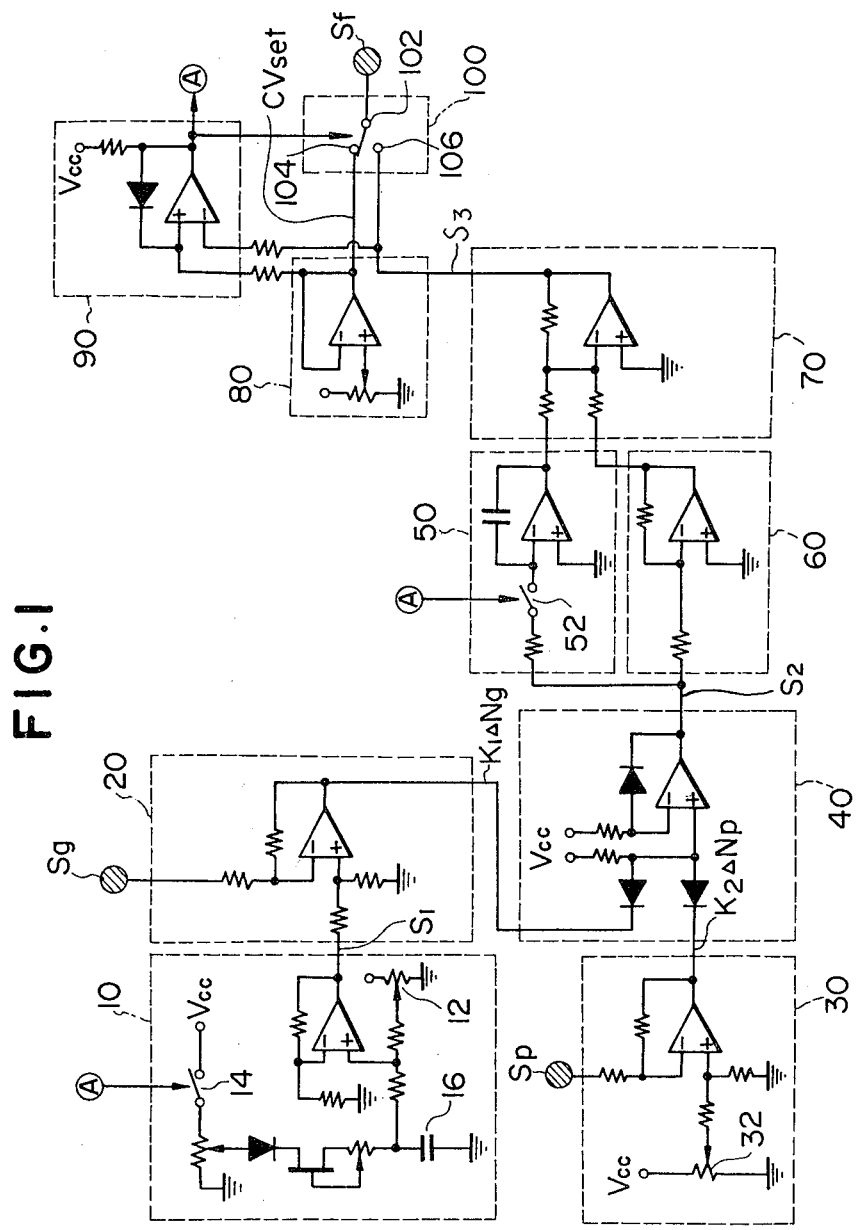
FIG. 1 is a circuit diagram showing the fundamentals of a fuel feed control system according to the present invention.

FIG. 1 shows a principal construction of a fuel feed control system, as a preferred embodiment of the present invention, for a two-shaft gas turbine engine. The illustrated particulars of the respective circuits enclosed by dashed lines should be taken only by way of example.

Indicated at 10 is a circuit to produce a signal $S_1$ which represents a target value Ngset of the rate of rotation of the gas generator shaft, i.e. the speed of the compressor turbine, of a two-shaft gas turbine engine. This circuit 10 has a trimmer 12 to set a low speed target value NgsetL suitable for starting of the engine and during a short time period required thereafter for accomplishment of sure ignition. Additionally, circuit 10 is provided with a capacitor 16 which is charged with a constant current while an analog switch 14 is closed and, when charged, causes the amplitude of the target value signal $S_1$ to gradually shift from the low speed target value of NgsetL to a high speed target value NgsetH suitable for normal operation of the engine. The state of the analog switch 14 is governed by the output of a comparison circuit 90 as described hereinafter.

A first subtraction circuit 20 receives the target value signal $S_1$ and another signal Sg which represents actual rate of rotation Ng of the gas generator shaft and produces an output signal $K_1 \Delta Ng$ which is proportional to the magnitude of a deviation $\Delta Ng$ of the actual speed Ng (implied by the signal Sg) from the target value implied by the signal $S_1$. ($K_1$ is a proportionality constant.)

A second subtraction circuit 30 includes a trimmer 32 to set a target value (rated speed) of the rate of rotation Npset of the power turbine of the engine and an operational circuit which receives a signal Sp representing actual speed Np of the power turbine and produces an output signal $K_2 \Delta Np$ which is proportional to the magnitude of a deviation $\Delta Np$ of the actual speed Np (implied by the signal Sp) from the target value Npset. ($K_2$ is a proportionality constant.)

The two subtraction circuits 20 and 30 are connected in parallel to a selection circuit 40 which has the function of selecting the signal smaller in amplitude between the two signals $K_1 \Delta Ng$ and $K_2 \Delta Np$ supplied from the subtraction circuits 20 and 30. That is, an output signal $S_2$ produced by circuit 40 agrees with the output of the first subtraction circuit 20 when $K_1 \Delta N_g$ is smaller in its value or amplitude than $K_2 \Delta Np$ but agrees with the output of the second subtraction circuit 30 when $K_1 \Delta Ng$ is larger than $K_2 \Delta Np$.

An integration circuit 50 and a coefficient multiplication circuit 60 are arranged in parallel so that the output $S_2$ of the selection circuit 40 is put into both of these two operational circuits 50 and 60. However, the integration circuit 50 has a switch 52 whose state is determined by the level of the output of the aforementioned comparison circuit 90, and circuit 50 is operative only while this switch 52 is closed.

An adder circuit 70 has the function of adding together the outputs of the integration circuit 50 and the coefficient multiplication circuit 60 and providing an output signal $S_3$ representing the result of the addition. The signal $S_3$ serves as a fuel rate control signal. When the control system of FIG. 1 functions as a closed-loop control system as will be described hereinafter the signal $S_3$, can be supplied to an actuator (not shown) to regulate the rate of fuel feed to the engine through a switching circuit 100.

The control system further comprises a fuel feed rate setting circuit 80 which provides to the switching circuit 100 a signal CVset. This signal represents an optimal fuel feed rate for ignition.

The comparison circuit 90 receives the control signal $S_3$ and the fuel feed rate signal CVset independently of the switching circuit 100 and produces an output signal which assumes a low level while the rate of rotation of the gas generator shaft is low so that a fuel feed rate implied by the control signal $S_3$ is greater than the feed rate implied by the signal CVset. The output signal shifts to a high level when a rise of the rotation rate of the gas generator shaft causes the control signal $S_3$ to imply a lower fuel feed rate than the signal CVset.

On the input side of the switching circuit 100, a contact 104 is connected to the fuel feed rate setting circuit 80 and another circuit 106 is connected to the adder circuit 70. The output of the comparison circuit 90 is also supplied to the switching circuit 100, such that output terminal 102 of the switching circuit 100 is connected to the contact 104 while the comparison circuit 90 provides a low level output but to the other contact 106 when the circuit 90 provides a high level output. Both the switch 14 in the target value setting circuit 10 and the switch 52 in the integration circuit 50 remain open while the output of the comparison circuit 90 is on the low level but become closed when the output of the circuit 90 shifts to the high level.

Thus, a fuel feed control signal $S_f$, output by the switching circuit 100 as the ultimate output of this control system, is identical with the preset fuel feed rate signal CVset while the comparison circuit 90 provides a low level output. The signal $S_f$ becomes identical with the control signal $S_3$ produced by the adder circuit 70 when the circuit 90 provides a high level output, and at the same time the control system of FIG. 1 commences to function as a closed-loop control system.

The function of the control system of FIG. 1 will be described in greater detail with reference to the chart of FIG. 2.

At starting of the gas turbine engine, the output terminal 102 of the switching circuit 100 is connected to the contact 104, so that the fuel feed control signal $S_f$ causes the actuator to feed fuel at an optimal rate for ignition, i.e. at the feed rate implied by the signal CVset. When ignition takes place, the gas generator shaft commences to rotate and undergoes an increase in the rate of rotation in advance of a rise in the rate of rotation of the power turbine.

During this stage the analog switch 14 in the target value setting circuit 10 remains open since the comparison circuit 90 provides a low level outpt, so that the target value signal $S_1$ represents the low speed target value NgsetL. The value of the deviation signal $K_1 \Delta Ng$ becomes smaller as the actual rate of rotation Ng of the gas generator shaft increases, while the deviation signal $K_2 \Delta Np$ of the power turbine speed Np from the target value Npset remains very high. Accordingly the selection circuit 40 puts out $K_1 \Delta Ng$ as its output signal $S_2$. The integration circuit 50 does not yet function since the low level output of the comparison circuit 90 keeps the switch 52 open. Therefore, the output $S_3$ of the adder circuit 70 does not differ from the output of the coefficient multiplication circuit 60 in which now is treated the deviation signal $K_1 \Delta Ng$.

The signal $S_3$ does not affect the fuel feed rate while the output terminal 102 of the switching circuit 100 is connected to the contact 104 to utilize the preset fuel feed rate signal CVset as the control signal $S_f$. However, the signal $S_3$ is continuously input to comparison circuit 90 from the beginning.

When the rate of rotation Ng of the gas generator shaft increases to a predetermined value, the deviation signal $K_1 \Delta Ng$ takes a sufficiently small value, so that the signal $S_3$ becomes smaller in value than the preset fuel feed rate signal CVset (at the point of time P in the chart of FIG. 2). The output of the comparison circuit 90 then shifts from the low level to a high level, so that the terminal 102 of the switching circuit 100 is disconnected from the contact 104 and connected to the contact 106, meaning the commencement of a closed-loop control of the fuel feed rate utilizing the output $S_3$ of the adder circuit 70 as the fuel feed rate control signal $S_f$. At the same time both the switch 14 in the target value setting circuit 10 and the switch 52 in the integration circuit 50 are closed.

The capacitor 16 in the circuit 10 is then charged with a constant current so that the target value Ngset of the rotation rate of the gas generator shaft implied by the signal $S_1$ increases from the low speed target value NgsetL to a predetermined high speed target value NgsetH (usually NgsetH is set at the rated maximum speed) at a predetermined rate. The integration circuit 50 commences to integrate the signal $S_2$, supplied by selection circuit 40, with respect to time. Since at this stage the rotation speed Np of the power turbine is still considerably lower than the target value Npset, the deviation signal $K_1 \Delta Ng$ is still smaller in value than the other deviation signal $K_2 \Delta Np$. Therefore, the signal $S_3$, which now serves as the fuel feed rate control signal $S_f$, is produced by the addition of one component proportional to the deviation signal $K_1 \Delta Ng$ and another component given by an integration of $K_1 \Delta Ng$. The fuel feed rate is thus under closed-loop control on the basis of the magnitude of deviation $\Delta Ng$ of actual speed Ng of the gas generator shaft from a target value Ngset. Accordingly the rotation of the gas generator shaft is accelerated so as to follow the rise of the target value Ngset implied by signal $S_1$ towards the high speed target value NgsetH. The rate of rise of the target value Ngset, which is determined by the circuit constants of the circuit 10, is preset such that the target rate of rotation can be reached as quickly as possible but without causing abnormalities such as surging.

During this stage the rate of rotation Np (which is implied by signal Sp) of the power turbine continues to rise, with the result that the magnitude of the deviation signal $K_2 \Delta Np$ from the target value Npset becomes equal to the magnitude of the deviation signal $K_1 \Delta Ng$ of the rotation rate of the gas generator shaft at a point of time Q in the chart of FIG. 2, and thereafter $K_2 \Delta Np$ becomes smaller than $K_1 \Delta Ng$. At the point of time Q, there occurs changeover of the output $S_2$ of the selection circuit 40 from $K_1 \Delta Ng$ to $K_2 \Delta Np$, meaning that thereafter the control system of FIG. 1 functions to regulate the fuel feed rate so as to realize agreement of actual speed Np of the power turbine with the target value Npset. Since the changeover of the Ng-based feedback control to the Np-based feedback control in the method of the present invention takes place at the point of time Q where $K_1 \Delta Ng = K_2 \Delta Np$, the changeover does not cause a discontinuous change in the rate of fuel feed and, therefore, is accomplished without the fear of causing a significant change in the torque, interruption of combustion or any other undesirable phenomenon.

When the load on the power turbine side increases while the Np-based feedback control is continued so as to maintain the power turbine speed Np constant, there occurs an increase in the rate of rotation Ng of the gas generator shaft. If the load becomes excessively high it is possible that the rotation rate Hg of the gas generator shaft may exceed the rated maximum speed taken as the high speed target value NgsetH. In the present invention, such a condition means that the deviation signal $K_1 \Delta Ng$ becomes negative and, hence, results in the selection circuit 40 outputting $K_1 \Delta Ng$ as the signal $S_2$ instead of $K_2 \Delta Np$ selected during the Np-based feedback control. Therefore, the Np-based feedback control is automatically suspended when rotation of the gas generator shaft exceeds the preset value NgsetH at the point of time R in FIG. 2 and, instead, the Ng-based feedback control is resumed in order to maintain the rotation rate NgsetH, which is made to agree with the rated maximum value, even when an overload condition continues. Thus, the control method according to the invention can prevent overrun of the gas generator during overload operating conditions of the engine and accordingly is quite effective for providing enhanced durability and safety.

It will be understood with no further explanation that the Ng-based closed-loop control automatically reverts to the Np-based closed-loop control when the load on the paper turbine drops below the rated maximum load.

What is claimed is:

1. A system to control the rate of fuel feed to a two-shaft gas turbine engine in which a gas generator shaft and a power turbine shaft rotate independently of each other, the system comprising components for controlling said fuel feed rate initially in accordance with the rotation rate of said gas generator shaft and thereafter in accordance with the rotation rate of said power turbine shaft, including:

first means for continuously producing a first electrical signal representing the magnitude of a deviation of actual rate of rotation of the gas generator shaft from a target value;

second means for continuously producing a second electrical signal representing the magnitude of a deviation of actual rate of rotation of the power turbine shaft from a target value;

third means for continuously making a comparison between said first and second signals and providing a third electrical signal which corresponds to a smaller one of said first and second signals;

said first means including means for presetting a low speed target value for the rate of rotation of the gas generator shaft during a first time period occurring shortly after starting the engine, so that the deviation of the rate of rotation of said gas generator shaft from said low target value represented by said first electrical signal is smaller than the deviation of the rate of rotation of the power turbine shaft represented by said second electrical signal during said first time period, and a higher speed target value thereafter, and fourth means for producing a fourth electrical signal which can serve as a fuel feed rate control signal by utilizing said third signal.

2. A system according to claim 1, wherein said first means have an additional function of gradually increasing the target value of the rate of rotation of the gas generator shaft at a predetermined rate during said time period.

3. A system according to claim 1 further including means for setting said first time period in accordance with the time necessary for the rate of rotation of said gas generator shaft to increase to a predetermined value.

4. A system to control the rate of fuel feed to a two-shaft gas turbine engine in which a gas generator shaft and a power turbine shaft rotate independently of each other, the system comprising:

first means for continuously producing a first electrical signal representing the magnitude of a deviation of actual rate of rotation of the gas generator shaft from a target value, said first means including means for presetting a low speed target value of the rate of rotation of the gas generator shaft, modulation means for increasing the target value of the rate of rotation of the gas generator shaft from said low speed target value to a high speed target value at a predetermined rate and switching means for keeping said modulation means inoperative while a low level signal is applied thereto and making said modulation means operative when a high level signal is applied thereto;

second means for continuously producing a second electrical signal representing the magnitude of a deviation of actual rate of rotation of the power turbine shaft from a target value;

third means for continuously making a comparison between said first and second signals and always providing a third electrical signal which corresponds to a smaller one of said first and second signals;

fourth means for producing a fourth electrical signal which can serve as a fuel feed rate control signal by utilizing said third signal;

fifth means for producing a fifth electrical signal which represents a relatively low fuel feed rate preset so as to create an air-to-fuel ratio suitable to the accomplishment of ignition;

sixth means for performing a switching function for said fourth and fifth signals to transmit only said fifth electrical signal to an actuator which can vary the fuel feed rate while said low level signal is applied to said sixth means and transmit only said fourth signal to said actuator when said high level signal is applied to said sixth means; and seventh means for continuously making a comparison between said fourth signal and said fifth signal and providing said low level signal to said first means and said sixth means while said fourth signal implies a higher fuel feed rate than said fifth signal but, instead, said high level signal when said fourth signal implies a lower fuel feed rate than said fifth signal;

said low speed target value (NgsetL) being preset such that said first signal represents a smaller magnitude of deviation than said second signal during a first time period extending from starting of the engine to a first point of the time where said seventh means make the changeover of said low level signal to said high level signal, said high speed target value being determined such that said first signal still represents a smaller magnitude of deviation than said second signal during a second time period extending from said first point of time to a second point of time where the magnitude of the deviation represented by said second signal becomes sufficiently small.

5. A system according to claim 4, wherein said high speed target value is made to agree with the rated maximum speed of the gas generator shaft.

6. A system according to claims 4 or 5, wherein said modulation means and said fourth means are adjusted such that said first signal and said second signal represent the same magnitude of deviations at said second point of time.

7. A system according to claim 4, wherein said modulation means comprise a capacitor and a circuit to charge said capacitor with a constant current.

8. A system according to claim 4, wherein said fourth means comprise a multiplication circuit to multiply said third signal by a predetermined coefficient, an integration circuit which is arranged in parallel with said multiplication circuit and performs an integration of said third signal with respect to time and an adder circuit which adds together the outputs of said multiplication circuit and said integration circuit thereby producing said fourth signal.

9. A system according to claim 8, wherein said integration circuit includes a switching means for keeping said integration circuit ineffective while said low level signal is applied thereto and making said integration circuit effective when said high level signal is applied thereto.

10. A system for controlling the rate of fuel feed to a two shaft gas turbine engine in which a gas generator shaft and a power turbine shaft rotate independently of each other, the system comprising:

first means for providing a first electrical signal representing the magnitude of a deviation of actual rate of rotation of the gas generator shaft from a target value;

second means for providing a second electrical signal representing the magnitude of a deviation of actual rate of rotation of the power turbine shaft from a target value;

fuel feed control signal generating means for providing an open loop control signal during a first short period immediately following a starting phase of the engine; and changeover means for causing said fuel feed control signal generating means to provide a closed loop control signal for a second period of time following said first period;

said control signal generating means including sequencing means for first causing said closed loop control signal to represent a difference between the rate of rotation of the gas generator shaft from a first target value and for subsequently causing said closed loop control signal to represent the smaller of said first and second electrical signals produced by said first and second means, wherein the target value utilized by said first means for generating said first electrical signal is greater than said first target value.

11. A system for controlling the rate of fuel feed according to claim 10 wherein said control signal generating means includes means responsive to said sequencing means for including in said fuel feed control signal components which are integral of and proportional to the smallest of said first and second electrical signals.

12. A system for controlling the rate of fuel feed according to claim 10 wherein said fuel feed control signal generating means further comprises suspending means for suspension of provision of said first electrical signal from said control signal when the rate of rotation of the gas generator shaft exceeds the target value thereof.

* * * * *